United States Patent
DeShong et al.

(10) Patent No.: US 11,365,680 B2
(45) Date of Patent: Jun. 21, 2022

(54) COMBUSTOR PANELS FOR GAS TURBINE ENGINES

(71) Applicant: United Technologies Corporation, Farmington, CT (US)

(72) Inventors: Eric DeShong, Pennsylvania Furnace, PA (US); Brian Knisely, State College, PA (US); Shawn Siroka, State College, PA (US); Ivan Monge-Concepcion, State College, PA (US); Stephen K. Kramer, Cromwell, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 280 days.

(21) Appl. No.: 16/519,578

(22) Filed: Jul. 23, 2019

(65) Prior Publication Data
US 2021/0025327 A1    Jan. 28, 2021

(51) Int. Cl.
*F02C 7/16*       (2006.01)
*F02C 3/14*       (2006.01)
(Continued)

(52) U.S. Cl.
CPC .............. *F02C 7/16* (2013.01); *B22F 12/00* (2021.01); *F02C 3/14* (2013.01); *F23R 3/002* (2013.01); *F23R 3/06* (2013.01); *B22F 2005/005* (2013.01); *B33Y 50/00* (2014.12); *F05D 2230/21* (2013.01); *F05D 2240/35* (2013.01);
(Continued)

(58) Field of Classification Search
CPC ...... B22F 12/00; B22F 2005/005; F02C 7/16; F02C 3/14; F23R 3/06; F23R 3/002; F23R 2900/00018; F23R 2900/03044; B33Y 50/00; F05D 2230/21; F05D 2240/35

See application file for complete search history.

(56) References Cited

U.S. PATENT DOCUMENTS

| 5,265,409 A | 11/1993 | Smith et al. |
| 2016/0109128 A1 | 4/2016 | Drake |

(Continued)

FOREIGN PATENT DOCUMENTS

| CN | 109737788 A | 5/2019 |
| EP | 3054113 A1 | 8/2016 |

OTHER PUBLICATIONS

Database WPI 2017, Week 201942 Thomson Scientific, London, GB, AN 2019-45100X. 1 page.
(Continued)

*Primary Examiner* — Moshe Wilensky
(74) *Attorney, Agent, or Firm* — Cantor Colburn LLP

(57) ABSTRACT

Methods for manufacturing combustor panels of gas turbine engines and combustor panels are described. The methods include defining a particle deposit near-steady state for at least a portion of a combustor panel, the particle deposit near-steady state representative of a build-up of particles on the at least a portion of the combustor panel during use, generating a template based on the defined particle deposit near-steady state, wherein the template includes one or more augmentation elements based on the representative of build-up of particles, and forming a combustor panel based on the template, wherein the formed combustor panel includes one or more augmentation elements defined in the template.

20 Claims, 5 Drawing Sheets

(51) Int. Cl.
  *F23R 3/06*   (2006.01)
  *F23R 3/00*   (2006.01)
  *B22F 12/00*   (2021.01)
  *B22F 5/00*   (2006.01)
  *B33Y 50/00*   (2015.01)

(52) U.S. Cl.
  CPC ............. *F23R 2900/00018* (2013.01); *F23R 2900/03044* (2013.01)

(56) References Cited

U.S. PATENT DOCUMENTS

| | | |
|---|---|---|
| 2016/0370008 A1 | 12/2016 | Drake et al. |
| 2019/0063750 A1* | 2/2019 | Porter ..................... B22C 7/02 |
| 2019/0186739 A1 | 6/2019 | Moura et al. |
| 2019/0186740 A1 | 6/2019 | Moura et al. |

OTHER PUBLICATIONS

European Search Report, European Application No. 20184817.3, dated Nov. 16, 2020, European Patent Office; European Search Report 9 pages.

\* cited by examiner

COMBUSTOR PANELS FOR GAS TURBINE ENGINES

BACKGROUND

The subject matter disclosed herein generally relates to impingement cooled components for gas turbine engines and, more particularly, impingement cooled components, such as combustor panels, having integral thermal transfer features for improved thermal management of such components.

A combustor of a gas turbine engine may be configured and required to burn fuel in a minimum volume (e.g., a combustion chamber). Such configurations may place substantial heat load on the structure of the combustor. The heat loads may dictate that special consideration is given to structures which may be configured as heat shields or panels configured to protect the walls of the combustor, with the heat shields being air cooled. Even with such configurations, excess temperatures at various locations may occur leading to oxidation, cracking, and high thermal stresses of the heat shields or panels. As such, impingement and convective cooling of panels of the combustor wall may be used. Convective cooling may be achieved by air that is trapped between the panels and a shell of the combustor. Impingement cooling is a process of directing relatively cool air from a location exterior to the combustor toward a back or underside of the panels. Leakage of impingement cooling air may occur through effusion holes without the panel or between adjacent panels at gaps that exist between the panels and thus form film cooling over a surface of the panels. However, it may be advantageous to have improved cooling mechanisms for combustor panels.

SUMMARY

According to some embodiments, methods of manufacturing combustor panels of gas turbine engines are provided. The methods include defining a particle deposit near-steady state for at least a portion of a combustor panel, the particle deposit near-steady state representative of a build-up of particles on the at least a portion of the combustor panel during use, generating a template based on the defined particle deposit near-steady state, wherein the template includes one or more augmentation elements based on the representative of build-up of particles, and forming a combustor panel based on the template, wherein the formed combustor panel includes one or more augmentation elements defined in the template.

In addition to one or more of the features described in one or more of the above embodiments, or as an alternative, further embodiments of the methods may include that the defining of the particle deposit near-steady state comprises operating a test rig including a test combustor panel.

In addition to one or more of the features described in one or more of the above embodiments, or as an alternative, further embodiments of the methods may include that the generating of the template comprises scanning the test combustor panel.

In addition to one or more of the features described in one or more of the above embodiments, or as an alternative, further embodiments of the methods may include that the scanning comprises at least one of CT scanning, topology scanning, and 3D scanning.

In addition to one or more of the features described in one or more of the above embodiments, or as an alternative, further embodiments of the methods may include that the defining of the particle deposit near-steady state comprises removing a used combustor panel from a gas turbine engine.

In addition to one or more of the features described in one or more of the above embodiments, or as an alternative, further embodiments of the methods may include that the generating of the template comprises scanning the used combustor panel.

In addition to one or more of the features described in one or more of the above embodiments, or as an alternative, further embodiments of the methods may include that the scanning comprises at least one of CT scanning, topology scanning, and 3D scanning.

In addition to one or more of the features described in one or more of the above embodiments, or as an alternative, further embodiments of the methods may include that the augmentation elements are integrally formed with the combustor panel and formed of the same material as the combustor panel.

In addition to one or more of the features described in one or more of the above embodiments, or as an alternative, further embodiments of the methods may include that the formed combustor panel is formed using an additive manufacturing process.

In addition to one or more of the features described in one or more of the above embodiments, or as an alternative, further embodiments of the methods may include that the defining of the particle deposit near-steady state comprises modeling operation of a combustor panel.

In addition to one or more of the features described in one or more of the above embodiments, or as an alternative, further embodiments of the methods may include that the one or more augmentation elements comprise one or more of dune shapes and mound shapes.

In addition to one or more of the features described in one or more of the above embodiments, or as an alternative, further embodiments of the methods may include that the formed combustor panel is formed using a casting process.

In addition to one or more of the features described in one or more of the above embodiments, or as an alternative, further embodiments of the methods may include that the particle deposit near-steady state is a state of particle aggregation on a cold side of the combustor panel during operation in which no additional particle aggregation occurs.

According to some embodiments, combustor panels of gas turbine engines are provided. The combustor panels include a hot side configured to be exposed to combustion within a gas turbine engine, a cold side opposite the hot side of the combustor panel, the cold side configured to receive cooling flow thereon, and one or more augmentation elements integrally formed on the cold side, wherein a location and geometry of the one or more augmentation elements on the cold side are based on a particle deposit near-steady state for the combustor panel.

In addition to one or more of the features described in one or more of the above embodiments, or as an alternative, further embodiments of the combustor panels may include that the augmentation elements are formed of the same material as the combustor panel.

In addition to one or more of the features described in one or more of the above embodiments, or as an alternative, further embodiments of the combustor panels may include that the one or more augmentation elements comprise one or more of dune shapes and mound shapes.

In addition to one or more of the features described in one or more of the above embodiments, or as an alternative, further embodiments of the combustor panels may include one or more effusion holes passing through the combustor panel from the cold side to the hot side.

According to some embodiments, gas turbine engines are provided. The gas turbine engines include a combustor section having a combustor shell and one or more combustor panels mounted to the combustor shell. At least one combustor panel of the one or more combustor panels includes a hot side configured to be exposed to combustion within the combustor section, a cold side opposite the hot side of the combustor panel, the cold side facing the combustor shell and configured to receive cooling flow thereon, and one or more augmentation elements integrally formed on the cold side, wherein a location and geometry of the one or more augmentation elements on the cold side are based on a particle deposit near-steady state for the combustor panel.

In addition to one or more of the features described in one or more of the above embodiments, or as an alternative, further embodiments of the gas turbine engines may include that the combustor shell includes a plurality of impingement holes and the particle deposit near-steady state is based on, in part, the location of the plurality of impingement holes.

In addition to one or more of the features described in one or more of the above embodiments, or as an alternative, further embodiments of the gas turbine engines may include that the augmentation elements are formed of the same material as the combustor panel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
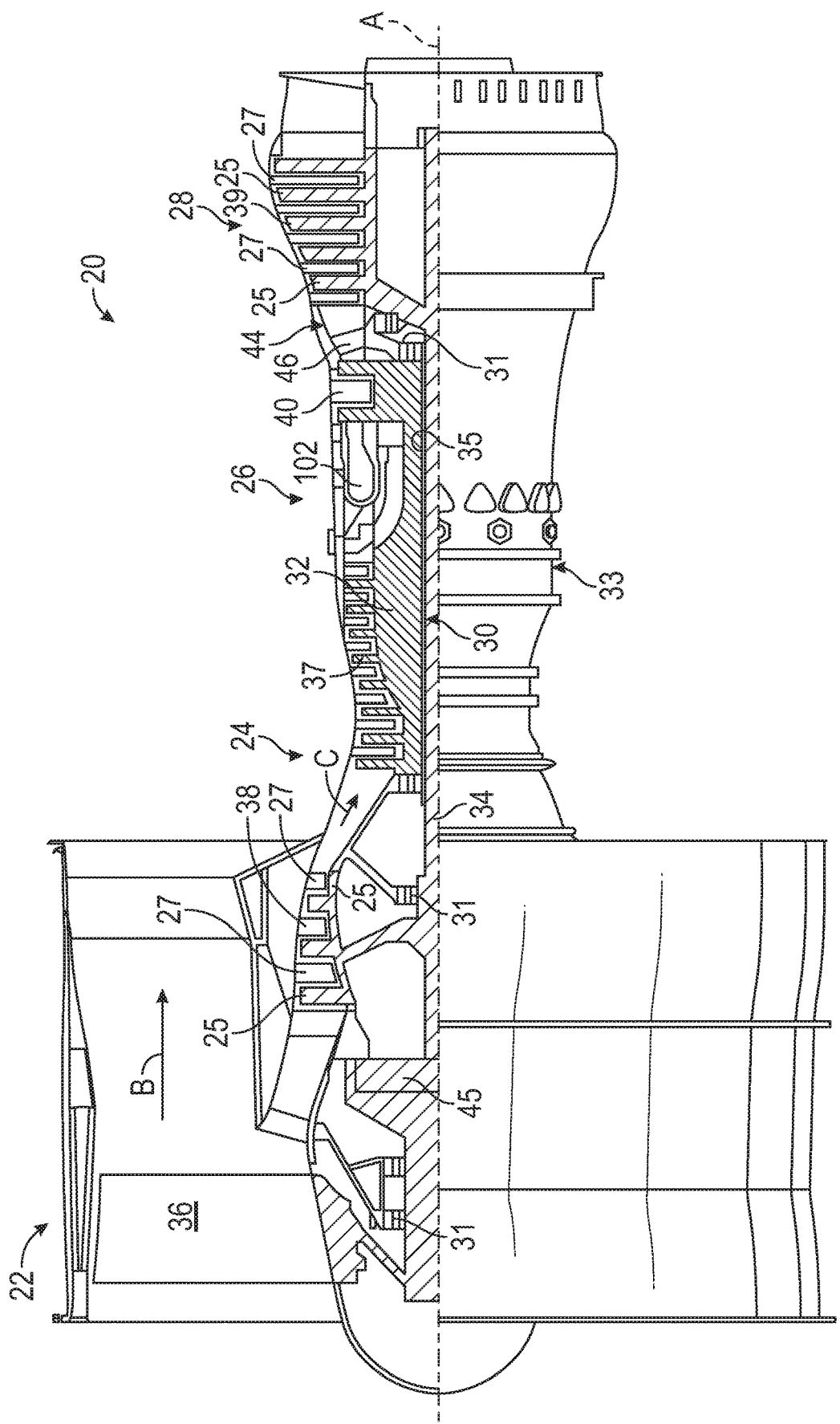
FIG. 1A is a schematic cross-sectional illustration of a gas turbine engine that may employ various embodiments disclosed herein.

FIG. 1A schematically illustrates a gas turbine engine 20. The exemplary gas turbine engine 20 is a turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 102 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 102, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be defined as the pressure measured prior to the inlet of the low pressure turbine 39 ratioed to the pressure at the outlet of the low pressure turbine 39 upstream to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(418.7°\ R)]^{0.5}$, where T represents the ambient temperature in degrees Rankine. The Low Corrected Fan Tip Speed according to one non-limiting embodiment of the example gas turbine engine 20 is less than about 1140 fps (341 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 1B:
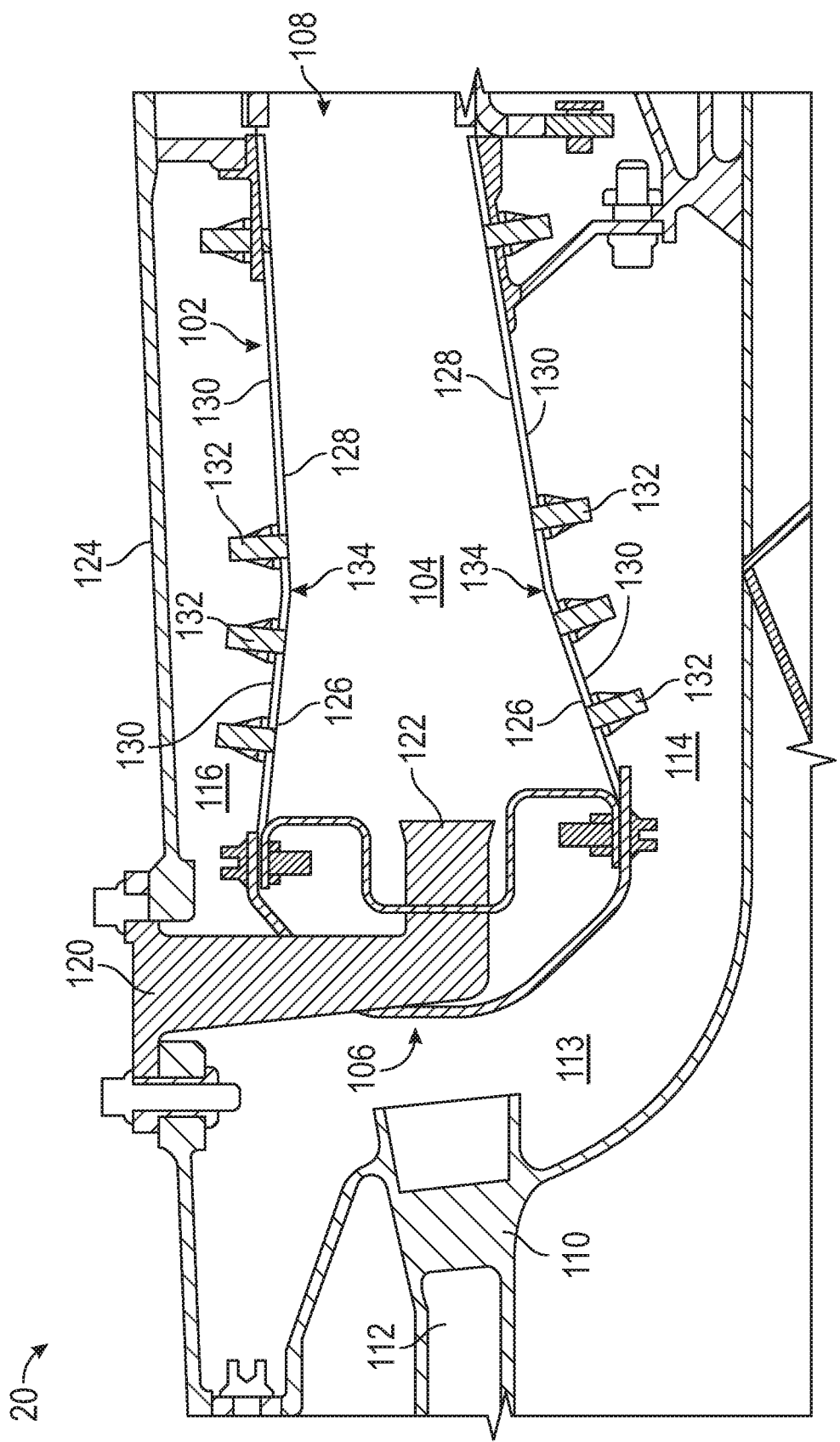
FIG. 1B is a schematic illustration of a combustor section of the gas turbine engine of FIG. 1A that may employ various embodiments disclosed herein.

FIG. 1B is a schematic illustration of a configuration of a combustion section of the engine 20 that can employ embodiments of the present disclosure. As shown, the engine 20 includes a combustor 102 defining a combustion chamber 104. The combustor 102 includes an inlet 106 and an outlet 108 through which air may pass. The air is supplied to the combustor 102 by a pre-diffuser 110.

In the configuration shown in FIG. 1B, air may be supplied from a compressor into an exit guide vane 112, as will be appreciated by those of skill in the art. The exit guide vane 112 is configured to direct the airflow into the pre-diffuser 110, which then directs the airflow toward the combustor 102. The combustor 102 and the pre-diffuser 110 are separated by a shroud plenum, cavity, or chamber 113 that contains the combustor 102. The shroud chamber 113 includes an inner diameter branch 114 and an outer diameter branch 116. As air enters the shroud chamber 113, a portion of the air will flow into the combustor inlet 106, a portion will flow into the inner diameter branch 114, and a portion will flow into the outer diameter branch 116. The air from the inner diameter branch 114 and the outer diameter branch 116 will then enter the combustion chamber 104 by means of one or more nozzles, holes, apertures, etc. that are formed on the external surfaces of the combustor 102. The air will then exit the combustion chamber 104 through the combustor outlet 108. At the same time, fuel is supplied into the combustion chamber 104 from a fuel injector 120 and a nozzle 122. The fuel is ignited within the combustion chamber 104. The combustor 102 of the engine 20, as shown, is housed within a shroud case 124 which defines, in part, the shroud chamber 113.

The combustor 102, as will be appreciated by those of skill in the art, includes one or more combustor panels 126, 128 that are mounted on an interior surface of one or more combustor shells 130 and are configured parallel to the combustor shell 130 (whether at the inner or outer diameter). The combustor panels 126, 128 can be removably mounted to the combustor shell 130 by one or more attachment mechanisms 132. In some embodiments, the attachment mechanisms 132 can be integrally formed with a respective combustor panel 126, 128 and/or the combustor shell 130, although other configurations are possible. In some embodiments, the attachment mechanisms 132 are studs or other structures that extend from the respective combustor panel 126, 128 through the interior surface thereof to a receiving portion or aperture of the combustor shell 130 such that the panel 126, 128 can be attached to the combustor shell 130 and held in place.

The combustor panels 126, 128 may include a plurality of cooling holes and/or apertures to enable fluid, such as gases, to flow from areas external to the combustion chamber 104 into the combustion chamber 104. Impingement cooling may be provided from the shell-side of the panels 126, 128 and hot gases may be in contact with the combustion-side of the panels 126, 128 during combustion within the combustion chamber 104. That is, hot gases may be in contact with a surface of the panels 126, 128 that is facing the combustion chamber 104.

First panels 126, as shown in FIG. 1B, are configured about the inlet 106 of the combustor 102 and may be referred to as forward panels. Second panels 128 may be positioned axially rearward and adjacent the first panels 126 and may be referred to as aft panels. The first panels 126 and the second panels 128 are configured with a gap 134 formed between axially adjacent first panels 126 and second panels 128. The gap 134 may be a circumferentially extending gap that extends about a circumference of the combustor 102. A plurality of first panels 126 and second panels 128 may be attached and extend about an inner diameter of the combustor 102, and a separate plurality of first and second panels 126, 128 may be attached and extend about an outer diameter of the combustor 102, as known in the art.

Figure 1C:
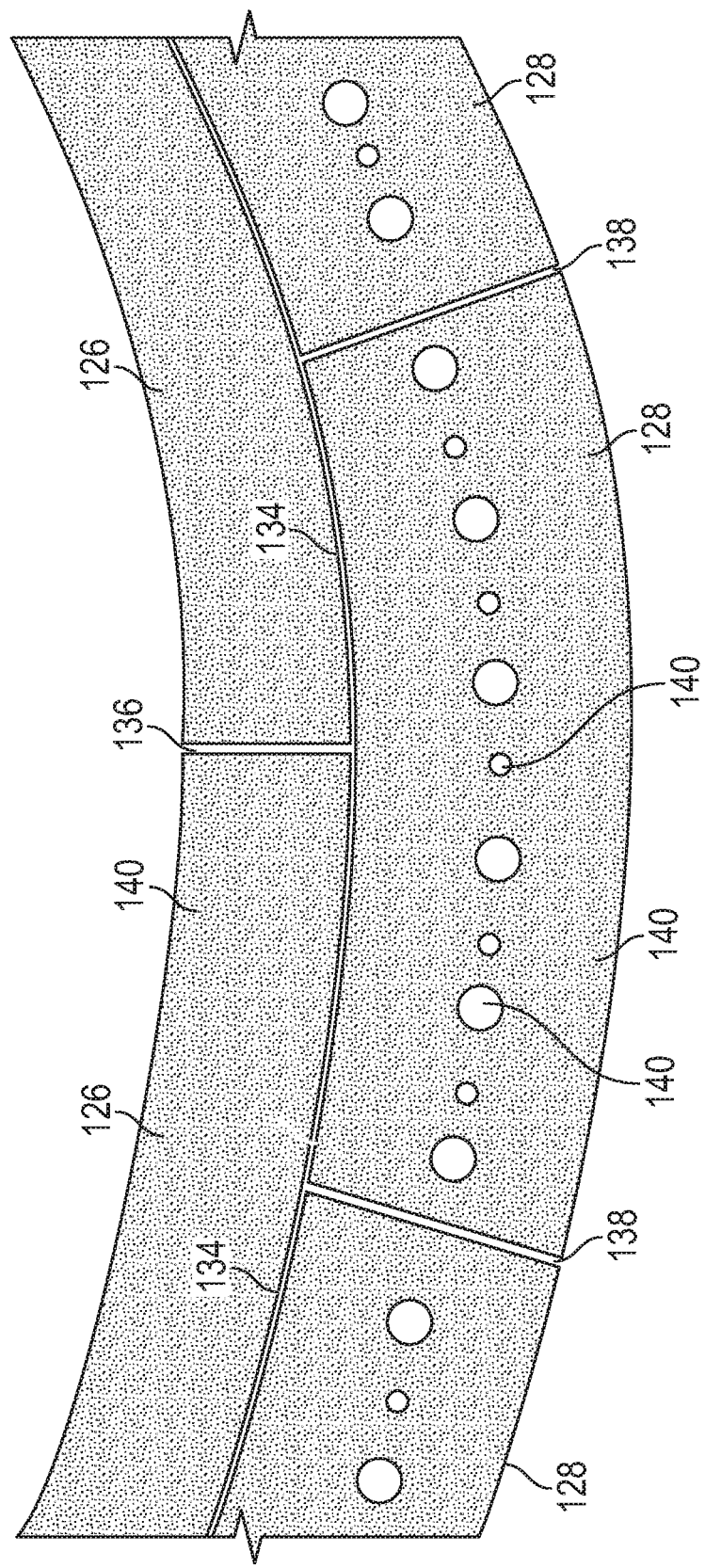
FIG. 1C is a schematic illustration of panels of the combustor of the combustor section shown in FIG. 1B that may employ various embodiment disclosed herein.

Turning now to FIG. 1C, a partial schematic illustration of a configuration of the combustor panels 126, 128 installed within the combustor 102 as viewed from the interior of the combustion chamber 104 is shown. The first panels 126 are installed to extend circumferentially about the combustion chamber 104 and form first axially extending gaps 136 between circumferentially adjacent first panels 126. Similarly, the second panels 128 are installed to extend circumferentially about the combustion chamber 104 and second axially extending gaps 138 are formed between circumferentially adjacent second panels 128. Moreover, as shown, a circumferentially extending gap 134 is shown between axially adjacent first and second panels 126, 128. Also shown in FIG. 1C are the various apertures 140 (e.g., impingement holes, dilution holes, holes, etc.) or other types of apertures and/or other fluid flow paths that are formed in the surfaces of the combustor panels 126, 128 to enable mixing flow to pass through the combustor panels 126, 128 (e.g., into and/or out of the page of FIG. 1C). As will be appreciated by those of skill in the art, additional (e.g., smaller) holes may be provided on the panels 126, 128 to provide cooling. Such additional holes may be cooling holes that are fed from a space between a shell and panel, with such space replenished with cooling air through impingement holes from the shroud, as will be appreciated by those of skill in the art.

Figure 2:
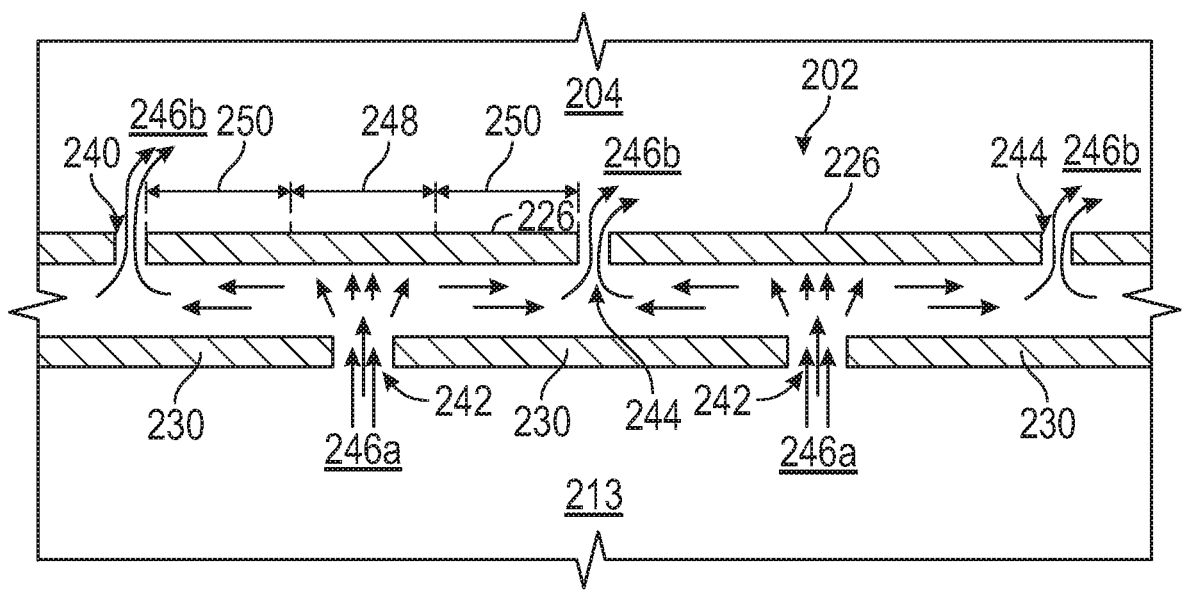
FIG. 2 is a schematic illustration of a combustor panel arranged relative to a combustor shell that can incorporate embodiments of the present disclosure.

Turning now to FIG. 2, a schematic illustration of a portion of a combustor 202 having a combustor shell 230 and a combustor panel 226 installed thereon that can incorporate embodiments of the present disclosure is shown. The combustor 202 can be formed similar to that shown and described above. The combustor shell 230 includes a plurality of impingement holes 242 and the combustor panel 226 includes a plurality of effusion holes 244. The impingement holes 242 are designed to enable a cooling flow of air 246 (having an impinging portion 246a and a film cooling portion 246b) to cool the combustor 202. The cooling flow of air 246 passes from a shroud chamber 213, through the impingement holes 242, through the effusion holes 244, and into a combustion chamber 204 of the combustor 202. The film cooling portion 246b of the cooling flow of air, as it enters the combustion chamber 204 through the effusion holes 244, can form a film of air over an interior surface of the combustor panel 226 to aid in cooling of the combustor panel 226. That is, the film cooling portion 246b can form a barrier between air at combustion temperatures and the combustor panel 226.

Although shown in FIG. 2 as simple passages, the effusion holes 244 may not be formed straight through or normal to the combustor panel 226. That is, as will be appreciated by those of skill in the art, effusion holes are often not formed normal to the panel, but rather can be angled, such as at shallow angles (e.g., 20-35 degrees, with the shallower angles beneficial for film cooling configuration (e.g., 20 degrees)) with respect to the plane of the combustor panel 226. Angled effusion holes can ensure and/or optimize the exit flowing air to "stick" to the combustor panel 226, thus creating a film cooling layer on the combustion chamber 204 side of the combustor panels 226. Further, in some embodiments, the impingement holes 242 can be formed normal to the combustor shell 230, as schematically shown in FIG. 2. Those of skill in the art will appreciate that FIG. 2 is provided for explanatory and illustrative purposes and is not to be limiting.

As schematically shown, the impinging portion 246a of the cooling air 246 will impinge upon and cool an impingement area or primary cooling zone 248 which is cooled by the cooling air 246. However, as the distance from the impingement hole 242 increases the effective cooling decreases at a secondary cooling zone 240 that is not cooled as effectively as the primary cooling zone 248.

The cooling air 246 cools the combustor panels 226 with impinging air 246a, which provides extremely high cooling (heat transfer coefficient) in the impingement zone (primary cooling zone 248), but the cooling quickly decays as the distance from the primary cooling zone 248 increases (e.g., the secondary cooling zone 240). Thus, the portion of the combustor panel 226 under the impingement hole 242 is locally very cool, but hotspots can occur in regions that are "far" (e.g., a distance greater than a few hole-diameters from the nearest impingement hole 242).

In addition to cooling decreases associated with distance from an impingement hole, dirt and other particulate matter can impact cooling, specifically at the location of impingement upon the hot combustor panel. Gas turbine engines must operate in a variety of environments, including those with suspended particles in the air (e.g., dirt, sand, etc.), whether in flight or on the ground (e.g., idling, taxiing, take-off, landing, etc.). The particles may be ingested into the engine and will be transported through the engine from an inlet to an outlet, and thus may pass through one or more of the sections of the gas turbine engine.

In the combustor, the particles, which may be reduced to very fine, micron sized particles (e.g., due to passing through the compressor section), may flow into the and through the cooling holes of the combustor. Combustors of gas turbine engines may use different approaches to provide cooling for combustor panels, including, but not limited to, effusion holes through a liner, slots through the liner; double wall systems with impingement holes through the shell, effusion holes through the liner/panels (i.e., impingement film float-wall), double-wall systems with holes through a liner feeding the space between the shell and panels, augmented heat transfer surface areas (e.g., pins, fins, or similar other features), double-wall systems that combine impingement, effusion, and surface enhancement, etc. The particles may collect on various surfaces within the gas turbine engine, including upon combustor panels, as the particles are impinged upon surfaces. Such particle aggregation may be caused by impinging flows or from separations in the flows (e.g., at the entrance of holes or around the pins or other features). When the particles collect on a heat transfer surface, such as the back side of a panel or liner, or in an effusion hole, the heat transfer through that surface is decreased, which leads to higher panel temperatures and ultimately, premature failure. The aggregation may be caused, in part, by impact forces (e.g., during an impingement) and/or due to the high temperatures such that the material of the particle bonds to or otherwise sticks to the surfaces. The aggregation of particles may be referred to as fouling of the surfaces.

The fouling of the heat transfer surfaces by the particles can reduce the life of the panels significantly (e.g., as much as 30-60%). In combustor applications, the particles collect on the "cold" side of the panel, where such particles are deposited by the impinging jets of air that come through the shell. The particle deposits may have specific characteristic shapes or geometries. For example, one such shape is a "mound" shape that is formed as the particles accumulate in a stagnation region as the impinging jet strikes the "cold" side of the panel. Another example shape may be a "dune" shape that results from a build-up in the areas between the impinging jets ("hot spots" described above). These mounds and dunes and other shapes may be caused by irregular or uneven aggregation and accumulation of particles in specific locations. That is, a non-uniform layer and/or pattern of particle deposits may be formed on a panel cold-side. This non-uniform patterning results in areas on the panel that may have more build-up of particles and other areas that may have less total build-up.

This may be exacerbated due to non-uniform cooling hole arrangements. The temperatures experienced by combustor panels is non-uniform, and thus certain areas may be hotter than others. For example, proximity to a fuel injection region and where combustion first occurs may be hotter than other locations along a combustor panel. Further, features such as stand-offs or supports may cause different thermal conditions around and proximate to such features.

The build-up and formation of particle deposits can cause cooling to be less effective, as the particle deposits may essentially insulate portions of a panel, thus resulting in cooling schemes being unable to effectively cool the panel surfaces that are coated and/or covered by particle deposits. This may result, in part, due to thermal properties and characteristics of the particles that may aggregate. The material properties of the particles may have lower thermal transfer qualities, and thus an impinging or cooling airflow in contact with the particle deposits may not as effectively cool a panel that has the material of the panel exposed to such cooling airflow.

Figure 3:
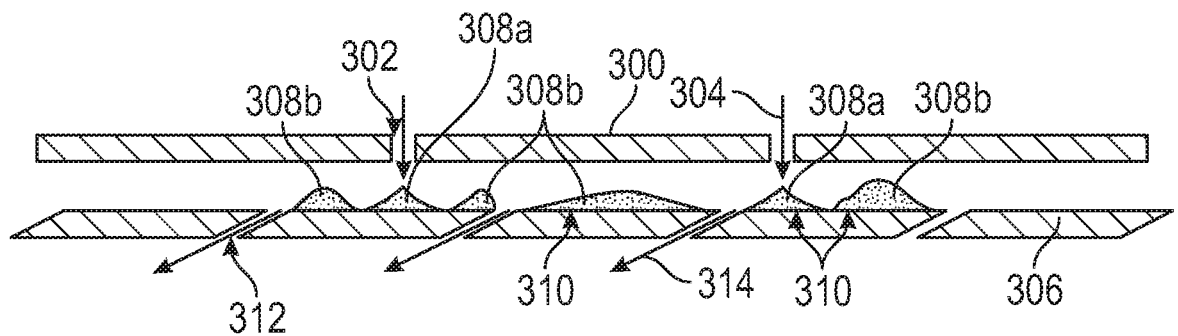
FIG. 3 is a schematic illustration of a combustor panel having a particle deposit formed thereon.

Turning now to FIG. 3, a schematic illustration of a particle deposit is shown. In FIG. 3, a combustor liner 300 includes impingement holes 302 arranged to allow impinging air 304 to impinge upon and cool a portion of a combustor panel 306. The combustor panel 306 may be formed of a material to contain combustion and may have selective thermal transfer properties to aid in the cooling of the combustor panel 306. The impinging air 304 may include particles therein, as described above. Over time, the particles in the impinging air 304 may aggregate upon a surface of the combustor panel 306 to form particle deposits 308a, 308b. The particle deposits 308a, 308b will insulate, block, or otherwise prevent the impinging air 304 from cooling, at least, a portion 310 of the combustor panel 306. The particle deposits 308a, 308b may thus cause increased conditions for the portion 310 and may lead to part failure. As illustratively shown, the particle deposits 308a, 308b include mounds 308a located incident to or directly aligned with the impingement holes 302 and dunes 308b located between the impingement holes 302. The impinging air 304 will flow through the impingement holes 302, deposit particles to form the mounds 308a, and then flow to effusion holes 312 to provide an effusion cooling flow 314 that may provide a film cooling to the combustor panel 306. As the cooling air flows from the impingement holes 302 to the effusion holes 312, some particles will be carried to form the dunes 308b. The particle deposits 308a, 308b, as noted above, may prevent sufficient or desired cooling to the combustor panel 306.

Accordingly, improved cooling of combustor panels may provide improved life and operation of combustors in gas turbine engines.

After many cycles of particle ingestion, the build-up of the particles on the combustor panel (or other surface of a combustor) will slow or reach a near-steady state. The term "near-steady state" is used because in practice and operation, a pure or perfect steady state would likely not occur, as particles may shift or adjust during various operational conditions. The term "near-steady state" is used also because it has been observed there is a period of fast growth of these features, then a period where the growth is slowed, but still growing. So, as will be appreciated, it may not be steady state, but rather a state where the feature is no longer growing at the rapid initial rate. That being said, the term "near-steady state" as used herein encompasses a true steady state and states close to such true steady state (whether static or variable). That is, near-steady state captures the concept of a generalized state of particle build-up on a combustor panel, and may be based on a build-up from real world use, which would likely be a near steady state or one achieved after a certain amount of operation or testing, or may capture modeled steady states which may be closer to or may represent true steady state conditions in the scope of a modeling scheme.

As such, the particle deposits will have created a surface geometry on the combustor panel surfaces (e.g., cold side) that minimizes stagnation zones and separation areas and helps direct all future particles through the film cooling holes. That is, over time, a particle deposit near-steady state will be achieved, where the aerodynamics within the system will prevent further build-up of particles, and such additional particles will be directed through the flow path without accumulation or aggregation. The particle deposit near-steady state is representative of a build-up of particles on the combustor panel during use. That is, once the particle deposit near-steady state is achieved, little, de minimis, or no additional particle aggregation and/or accumulation will occur.

Embodiments of the present disclosure are directed to the creation and formation of combustor panels or other components based on this particle deposit near-steady state. For example, by 3D-surface/topology scanning a surface that has achieved a particle deposit near-steady state, a new component can be cast or manufactured with the contours of accumulated particles cast or manufactured in. That is, a component can be formed from thermally desirable materials that has a topology of the particle deposit near-steady state, and thus improved cooling and thermal transfer may be achieved, while reducing or eliminating particle aggregation during operation. That is, a prefabricated component having a particle deposit near-steady state geometry may minimizes the build-up of particle in the areas which may typically have such build-up and may force the particles through apertures of the components (e.g., effusion holes, impingement holes, etc.). The minimal particle build-up may also help with minimizing the insulating effect on heat transfer caused by particle deposits stuck to the components of the combustor of the gas turbine engine.

Figure 4:
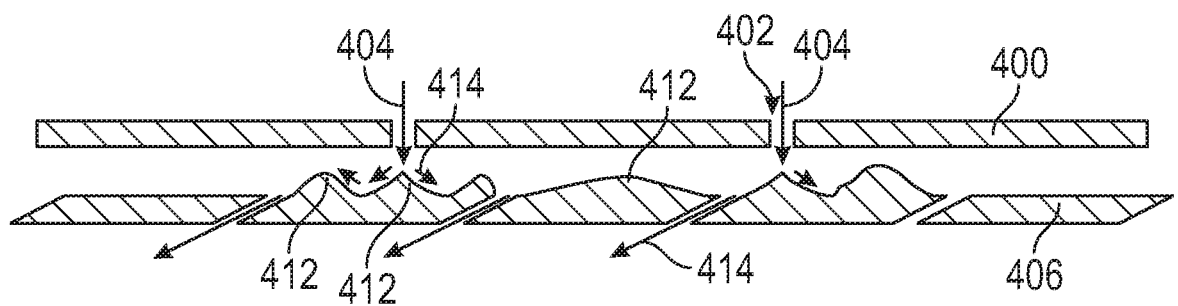
FIG. 4 is a schematic illustration of a combustor panel in accordance with an embodiment of the present disclosure having an augmentation element.

For example, turning now to FIG. 4, a schematic illustration of a modified combustor panel 406 in accordance with an embodiment of the present disclosure is shown. In FIG. 4, a combustor liner 400 includes an impingement hole 402 arranged to allow impinging air 404 to impinge upon and cool a portion of the combustor panel 406. The combustor panel 406 is formed of a material to contain combustion and may have selective thermal transfer properties to aid in the cooling of the combustor panel 406. Similar to that described with respect to FIG. 4, the impinging air 404 may include particles therein.

In this embodiment, the combustor panel 406 is manufactured based on a particle deposit near-steady state (e.g., a near-steady state of particle deposit 408 shown in FIG. 4). As such, the combustor panel 406 includes an augmentation element 412 that has the geometry of the particle deposit near-steady state that accrued due to particles deposited by the impinging air 404 through the impingement hole 402. Advantageously, the material that forms the augmentation element 412 may be the same material as the combustor panel 406, and thus may have improved thermal properties as compared to a particle deposit that forms on the combustor panel 406 during use.

Because the augmentation element 412 has the geometry of the particle deposit near-steady state, further accumulation of particles will be minimized or eliminated. As such, any further particles within the impinging air 404 may be deflected and/or directed away from the augmentation element 412 as shown as deflected particles 414. These deflected particles 414 will continue flowing with the cooling air and into a combustion chamber, and will not aggregate upon surfaces of the combustor panel 406.

To form such improved combustor panels, a mapping or scanning of a combustor panel having particle deposit near-steady state may be performed. Panels having particle deposit near-steady state may be from in-use or operational combustor panels that are removed from a used gas turbine engine (e.g., a used combustor panel) or may be a test combustor panel that is run in a test rig in a laboratory or other testing condition. Alternatively, modeling of particle deposit near-steady state for a combustor panel may be performed using such techniques as Computational Fluid Dynamics with particulate deposition sub-models. Based on the mapping or modeling, a template may be formed for the manufacturing of new combustor panels having one or more augmentation elements formed therewith, based on the particle deposit near-steady state. That is a pattern or irregular pattern of augmentation elements may be defined in the template of a new panel such that additional material may be used to form the augmentation elements out of the same material as the rest of the combustor panel.

Figure 5:
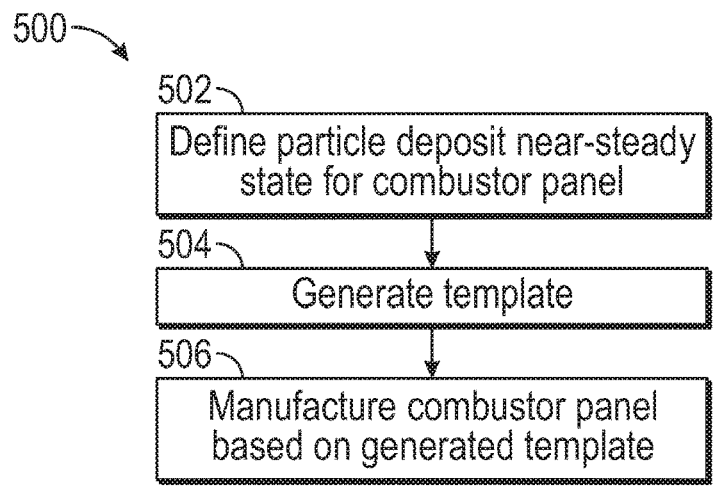
FIG. 5 is a flow process for forming a combustor panel in accordance with an embodiment of the present disclosure.

For example, turning now to FIG. 5, a flow process 500 for manufacturing a combustor panel for a gas turbine engine is shown.

At block 502, a particle deposit near-steady state is defined. The defined particle deposit near-steady state may be achieved by extracting an in-use combustor panel from an operational engine, may be achieved by running a test rig with particles injected into the system, and/or may be based on computer modeling of a given combustor panel within an operational gas turbine engine. In the case of a combustor panel from an operational engine or a test rig, the defining of the particle deposit near-steady state may be achieved by topology imaging, 3D imaging, or other type of scanning/imaging of a surface having particle deposit near-steady state. For example, 3D multi-point or line scanning may be used. In other embodiments, computerized tomography (CT) scanning may be used. The imaging or scanning may generate a data set that can be used to plot a three dimensional structure for defining a mold or other template.

At block 504, a component template having particle deposit near-steady state augmentation elements therein may be generated. A computerized generation may be employed to create the template. The template may be a mold, a three-dimensional model, a die, a machining-plan, etc. that can be used in various manufacturing processes for forming combustor panels.

At block 506, a combustor panel is manufactured based on the generated template, with the manufactured combustor panel having one or more augmentation elements formed thereon. The manufacturing may be by die-mold, machining, additive manufacturing, casting, etc. It is noted that the augmentation elements are formed from the same material as the rest of the combustor panel, and thus will have thermal properties based thereon, which are better than the thermal properties of, for example, a particle deposit that may form on the combustor panel during use.

Figure 6:
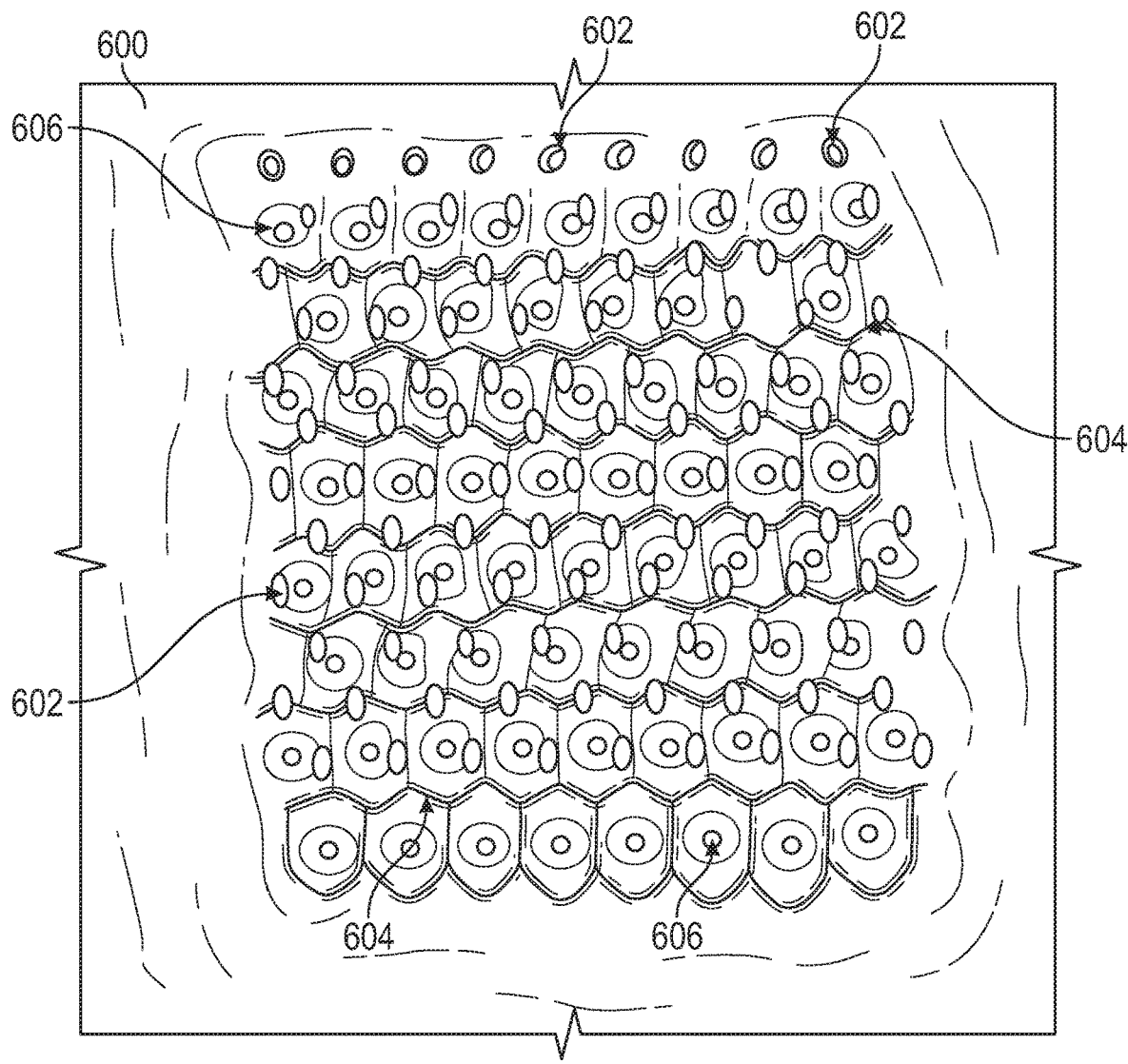
FIG. 6 is a schematic plan view illustration of a cold side of a combustor panel in accordance with an embodiment of the present disclosure.

Turning now to FIG. 6, a schematic illustration of a portion of a combustor panel 600 in accordance with an embodiment of the present disclosure is shown. The combustor panel 600 may be a manufactured component formed in accordance with process 500 described above. The combustor panel 600 is a unitary part having various particle deposit near-steady state augmentation elements arranged thereon. The combustor panel 600, as shown, includes a plurality of effusion holes 602 arranged to allow a cooling flow to pass through the combustor panel 600. The view of FIG. 6 is a plan view illustrating a "cold side" of the combustor panel 600, with the opposite side being a "hot side" that is exposed to a combustion chamber during operation within a gas turbine engine.

The particle deposit near-steady state augmentation elements are arranged in a non-uniform pattern or arrangement, which may be the result of different cooling flows and requirements of a combustor panel during use. As shown, the combustor panel 600 includes dunes 604 and mounds 606. The dunes 604 and mounds 606 are augmentation elements that are based on a steady state of particle deposits of a combustor panel. The dunes 604 and the mounds 606 may be formed of the same material as that which forms the entire combustor panel 600, as described above.

It is noted that the formation of the augmentation elements 604, 606 is an irregular pattern. The irregularity may be the result of different cooling scheme and fluid characteristics of cooling flows (e.g., impingement, effusion, diffusion, etc.). Due the irregular or non-uniform cooling flows, location of impingement holes, etc., the near-steady state of the particle deposits is a non-uniform pattern or distribution. However, with the combustor panel 600 installed within a gas turbine engine, particle deposits may be reduced and/or eliminated, thus enabling prolonged part-life as compared to a typical smooth surface combustor panel.

Although shown and described herein with various numbers and arrangements of augmentation elements on combustor panels, those of skill in the art will appreciate that such examples are provided for illustrative and explanatory purposes and are not to be limiting. For example, the number, geometry, size, distribution, etc. of augmentation elements that are included on a combustor panel can be selected to optimize thermal conductivity and balance such optimization with other conditions and/or considerations, including, but not limited to, combustor panel strength, combustor panel weight, location and arrangement of impingement holes, effusions holes, and/or attachment mechanisms. Further, it should be appreciated that a specific engine and/or engine configuration may have a different near-steady state of particle deposits, and thus a given panel may be customized for a single, individual engine, for a specific type of engine configuration, etc., without departing from the scope of the present disclosure.

Advantageously, embodiments described herein provide for improved combustor panels. By modeling, scanning, or imaging a near-steady state of a combustor panel with particle deposits, a new combustor panel may be manufactured with such near-steady state compensated for by the inclusion of augmentation elements formed integrally with the structure and material of the combustor panel. Thus, in operation, particle deposits may be minimized or eliminated, and thus part life may be improved.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A method of manufacturing a combustor panel of a gas turbine engine comprising:
   defining a particle deposit near-steady state for at least a portion of a combustor panel, the particle deposit near-steady state representative of a build-up of particles on the at least a portion of the combustor panel during use;
   generating a template based on the defined particle deposit near-steady state, wherein the template includes one or more augmentation elements based on the representative of build-up of particles; and
   forming a combustor panel based on the template, wherein the formed combustor panel includes one or more augmentation elements defined in the template,
   wherein the one or more augmentation elements are formed of the same material as the formed combustor panel and wherein the one or more augmentation elements are identical to a geometry and location of the near-steady state build-up of particles defined in the particle deposit near-steady state.

2. The method of claim 1, wherein the defining of the particle deposit near-steady state comprises operating a test rig including a test combustor panel.

3. The method of claim 2, wherein the generating of the template comprises scanning the test combustor panel.

4. The method of claim 3, wherein the scanning comprises at least one of CT scanning, topology scanning, and 3D scanning.

5. The method of claim 1, wherein the defining of the particle deposit near-steady state comprises removing a used combustor panel from a gas turbine engine.

6. The method of claim 5, wherein the generating of the template comprises scanning the used combustor panel.

7. The method of claim 6, wherein the scanning comprises at least one of CT scanning, topology scanning, and 3D scanning.

8. The method of claim 1, wherein the formed combustor panel is formed using one of an additive manufacturing process and a casting process.

9. The method of claim 1, wherein the defining of the particle deposit near-steady state comprises modeling operation of a combustor panel.

10. The method of claim 1, wherein the one or more augmentation elements comprise one or more of dune shapes and mound shapes.

11. The method of claim 1, wherein the particle deposit near-steady state is a state of particle aggregation on a cold side of the combustor panel during operation in which no additional particle aggregation occurs.

12. The method of claim 1, wherein the formed combustor panel is formed using one of an additive manufacturing process and a casting process.

13. The method of claim 1, wherein the one or more augmentation elements comprise one or more of dune shapes and mound shapes.

14. The method of claim 1, wherein the particle deposit near-steady state is a state of particle aggregation on a cold side of the combustor panel during operation in which no additional particle aggregation occurs.

15. A method of manufacturing a combustor panel of a gas turbine engine comprising:
   operating a test rig including a test combustor panel;
   scanning the test combustor panel using at least one of CT scanning, topology scanning, and 3D scanning;
   defining a particle deposit near-steady state for at least a portion of the test combustor panel, the particle deposit near-steady state representative of a build-up of particles on the at least a portion of the combustor panel during use;
   generating a template based on the defined particle deposit near-steady state, wherein the template includes one or more augmentation elements based on the representative of build-up of particles; and
   forming a combustor panel based on the template, wherein the formed combustor panel includes one or more augmentation elements defined in the template.

16. The method of claim 1, wherein the augmentation elements are integrally formed with the combustor panel and formed of the same material as the combustor panel.

17. A method of manufacturing a combustor panel of a gas turbine engine comprising:
   removing a used combustor panel from a gas turbine engine;
   scanning the used combustor panel using at least one of CT scanning, topology scanning, and 3D scanning;
   defining a particle deposit near-steady state for at least a portion of the used combustor panel, the particle deposit near-steady state representative of a build-up of particles on the at least a portion of the combustor panel during use;
   generating a template based on the defined particle deposit near-steady state, wherein the template includes one or more augmentation elements based on the representative of build-up of particles; and
   forming a combustor panel based on the template, wherein the formed combustor panel includes one or more augmentation elements defined in the template.

18. The method of claim 17, wherein the one or more augmentation elements comprise one or more of dune shapes and mound shapes.

19. The method of claim 17, wherein the particle deposit near-steady state is a state of particle aggregation on a cold side of the combustor panel during operation in which no additional particle aggregation occurs.

20. The method of claim 17, wherein the augmentation elements are integrally formed with the formed combustor panel and formed of the same material as the formed combustor panel.

* * * * *